Nov. 2, 1965
J. S. GATES ETAL
3,215,397
SERVO REGULATOR VALVE
Filed Dec. 1, 1961
3 Sheets-Sheet 1
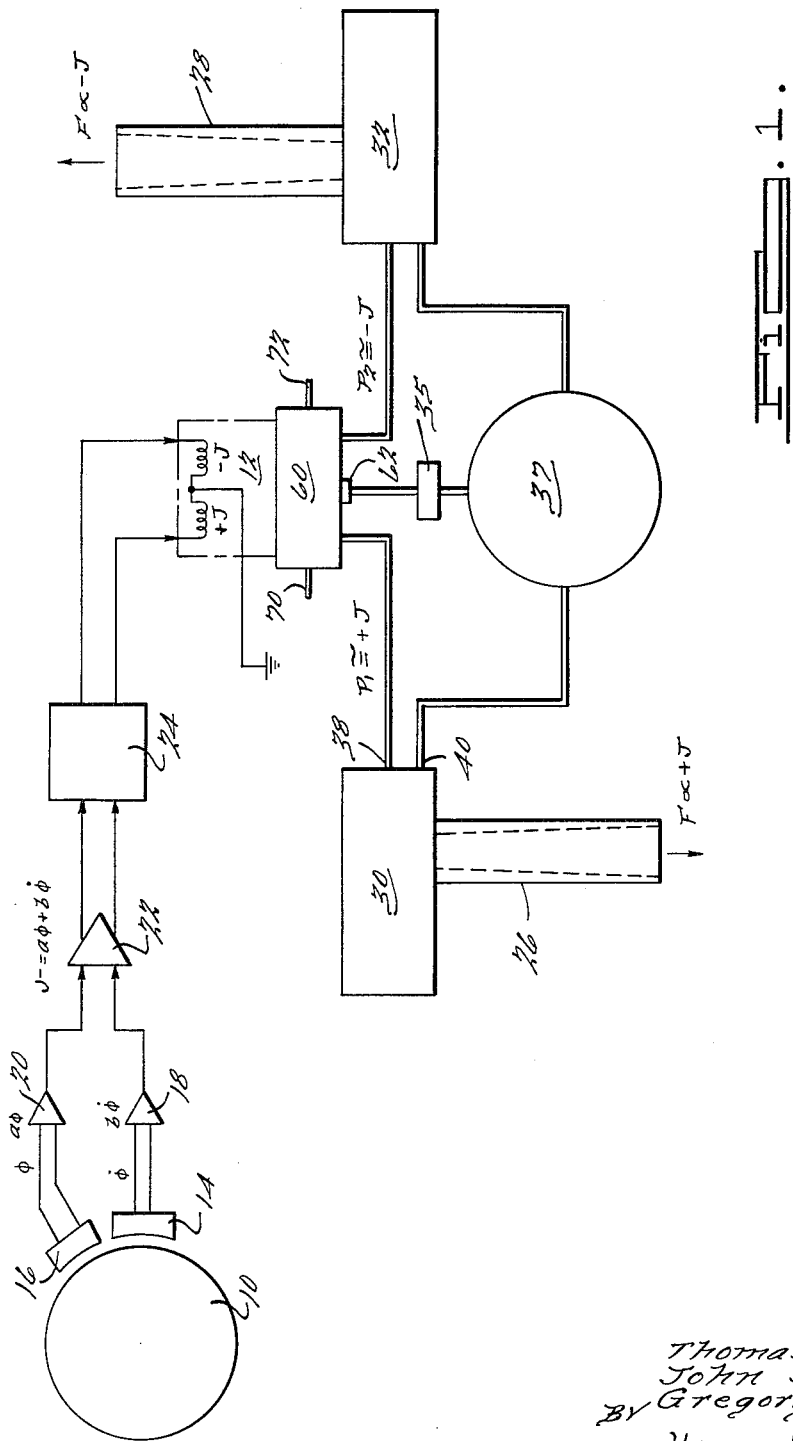
INVENTORS.
Thomas V. Ballard
John S. Gates
Gregory D. Noyes
BY
Harry R. Dumont
ATTORNEY.

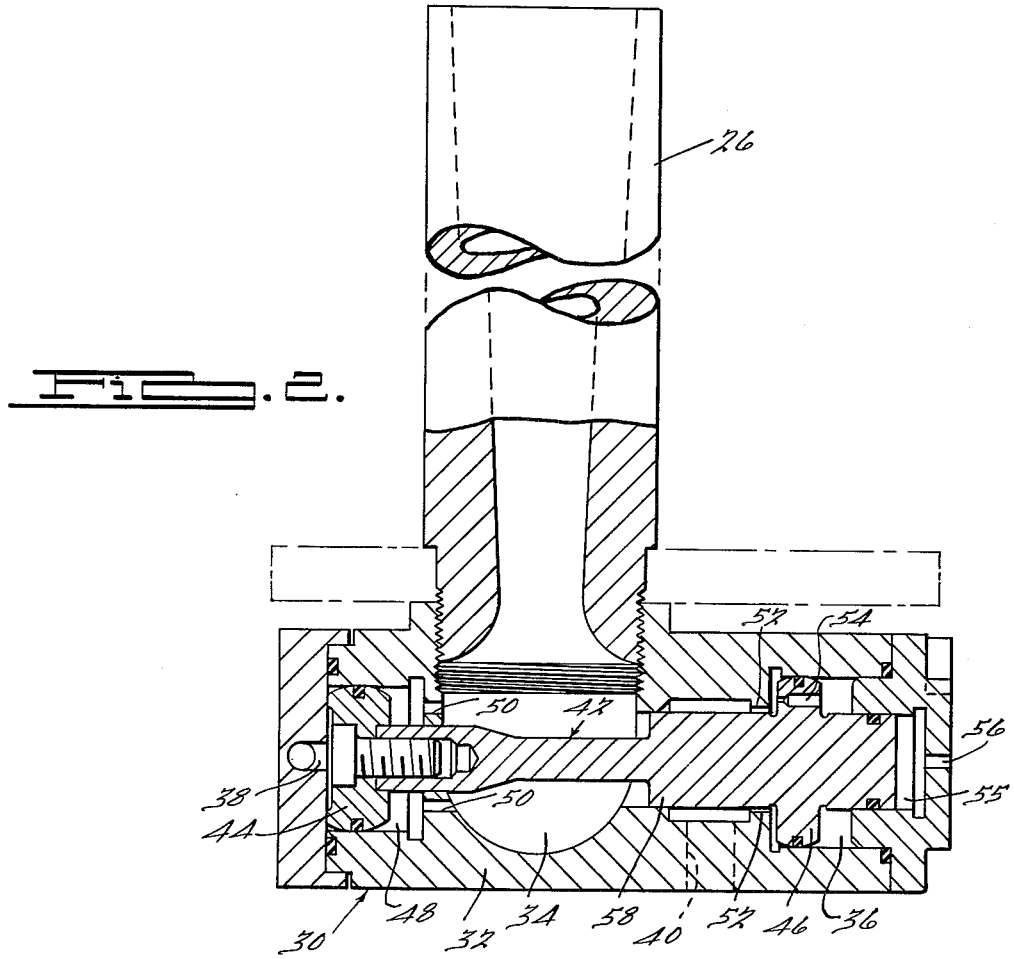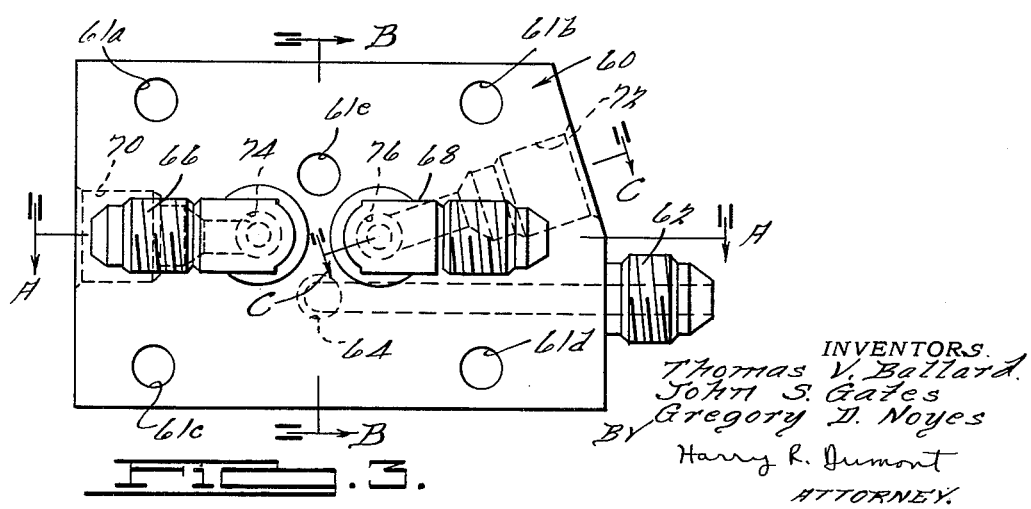

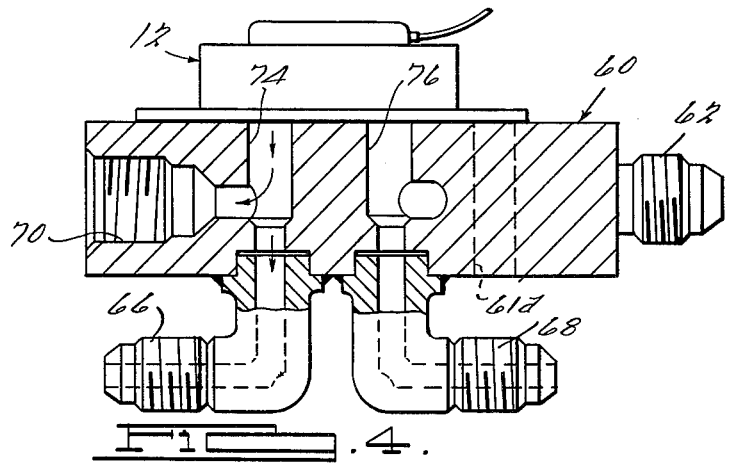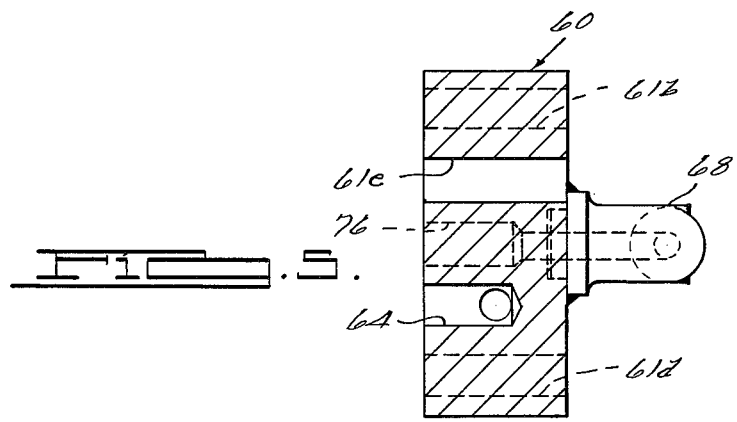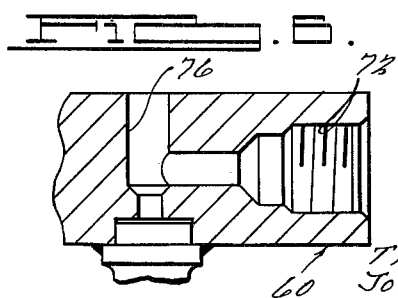

3,215,397
SERVO REGULATOR VALVE
John S. Gates, Royal Oak, Thomas V. Ballard, Warren, and Gregory D. Noyes, Troy, Mich., assignors to Chrysler Corporation, Highland Park, Mich., a corporation of Delaware
Filed Dec. 1, 1961, Ser. No. 156,332
8 Claims. (Cl. 251—50)

This invention relates generally to pneumatic attitude control systems for missile guidance and, more particularly, to a servo regulator valve for utilization therein.

Attitude control systems for missile guidance commonly use a plurality of thrust generating units distributed about the center of gravity of the missile. The magnitude of thrust of each such unit depends upon both longitudinal and lateral axis rotations so that each unit produces corrective rotation of the vehicle about both yaw and pitch axis. The system of the present invention provides a means of obtaining jet reaction forces which are proportional to an electrical input signal which is in turn derived from error signals in missile attitude error and attitude rate of change sensed from a directional gyroscope. To achieve this end, four pneumatic reaction jets are located at the tips of the missile tail fins. The basic requirement of the pneumatic attitude control system is to achieve a substantially linear variation of thrust with a very short time lag of the order of 20 milliseconds or less behind electrical error signals. This linearity must be preserved in spite of the depletion of a high pressure gas source during system operation.

Accordingly, it is an object of this invention to provide an improved servo regulator which will produce a variable nozzle chamber pressure in response to a variable control pressure.

It is an additional object of this invention to provide a servo regulator which is insensitive to supply pressure variations over a broad range.

It is a further object of this invention to provide a servo regulator which utilizes high density operating fluid as a damping medium.

It is a still further object of this invention to provide a servo regulator which will maintain constant chamber pressure and constant servo pressure for an unvarying servo valve input electrical signal.

Further objects and advantages of this invention will become apparent from a consideration of the accompanying specification and drawings of which FIGURE 1 is a functional block diagram of the attitude control system incorporting the present invention;

FIGURE 2 is a cross sectional view of the servo regulator valve;

FIGURE 3 is a bottom plan view of the manifold block utilized in combination with the servo valve;

FIGURE 4 is a sectional view taken along the line A—A of FIGURE 3 and includes a diagrammatic showing of the servo valve as it is operatively connected to the manifold block;

FIGURE 5 is a sectional view taken along the line B—B of FIGURE 3, and

FIGURE 6 is a sectional view taken along the line C—C of FIGURE 3.

FIGURE 1 shows a control system for a missile in one plane of control as, for example, in the pitch plane. Included as the elements of this system are a gyroscope 10, mounted along the axis of the missile, servo valve 12, and the intermediate electrical control system which includes a pair of electrical pick-offs 14 and 16 each of which is operatively connected with the rotor of gyroscope 10 to provide, respectively, electrical outputs representative of the rate ($\dot{\phi}$) and displacement ($\phi$) of its movement. The electrical outputs from pick-offs 14 and 16 are next passed through amplifiers 18 and 20, respectively, and into a summing amplifier 22 and demodulator 24. The demodulator 24 rectifies the summed current outputs from pick-offs 14 and 16 and changes these into direct current pulses of either plus or minus polarity to coils indicated on the drawing as "+J" or "—J." Depending on whether the polarity of the output is plus or minus, one of the oppositely oriented thrust jets 26 or 28 will be operated with a force $F\alpha+J$ or $F\alpha-J$. Thrust jets 26 and 28 are controlled in their operation by servo valve 12, a manifold block 60 associated therewith, and servo regulators 30 and 32 respectively. The operating pressure for servo valve 12 and servo regulators 30 and 32 are derived from a single source of pressurized fluid 37. Inserted in the line between the servo valve 12 and a source of pressurized fluid 37 is a valve regulator 35 of a type well known in the art whose function is to maintain a constant pressure to servo valve 12 independent of diminution of pressure in source 37. The thrust from jets 26 and 28 is controlled as a linear function of the electrical input signal by means of the servo system comprising the servo valve 12, manifold block 60, and the servo regulators 30 and 32. It will be appreciated that with the present system, a pneumatic, hydraulic, or mechanical operation of the servo valve 12 may be utilized to linearly control downstream pressure.

FIGURE 2 shows the detail of one of the servo regulator valves 30 in a closed position with its associated thrust jet 26 mounted thereon. The valve body 32 has a central hemispheric chamber portion 34 communicating with thrust jet 26 and a second chamber portion 36 formed near its righthand end. A control pressure inlet 38 is connected to the output from servo 12 and an operating pressure inlet port 40 is directly connected to the source of pressurized fluid 37. The valve operating member is indicated generally by the numeral 42. Operating member 42 is cylindrical in shape and differentially movable along the axis of valve body 32 in accordance with control pressure from servo valve 12. Located proximate opposite ends of operating member 42 are land portions 44 and 46 comprising driving piston 44 and damping piston 46, respectively, which are seated in central annular chambers 48 and 36 formed in valve body 32. Annular chamber 48 has a plurality of ports 50 connecting it to central chamber portion 34. Annular chamber 36 has a plurality of ports 52 communicating between operating pressure inlet 40 and chamber 36 through ports 52, orifices 54 and the chamber therebetween or, alternately they may be joined through an enlarged bore through valve body 32. It will further be noted that damping piston 46 has a plurality of orifices 54, one of which is shown, longitudinally formed therein. A vent hole 56 is provided in the right end portion of valve body 32. The actual opening and closure of the valve body is accomplished by a central land portion 58 formed on operating member 42. Rightward movement of operating member 42 serves to pass operating pressure from inlet port 40 to central chamber 34 and out through thrust jet 26.

FIGURE 3 shows the manifold block 60 which in connection with servo valve 12 forms the second portion of the servo system utilized in the present invention. Bolt holes 61a–d are provided for mounting the manifold block 60 to the base of servo valve 12 in the manner illustrated in FIGURE 4, hereinafter. Aperture 61e communicates through manifold block 60 to servo valve 12 to provide a pressure vent therefor. The manifold block 60 has inlet nozzle 62 and a conduit 64 formed therein serving as the input of total pressure from the source of pressurized fluid 37 to the servo valve 12. Output fittings 66 and 68 extend downwardly from the manifold block 60 and are connected through conduits to provide a control pressure for servo regulators 30 and 32, respectively. A pair of orifice fittings 70 and 72 are provided which are connected to vertically extending conduits 74 and 76 which receive the outputs of control pressure from servo valve 12. Orifice fittings 70 and 72 serve to communicate between conduits 74 and 76, respectively, and atmospheric pressure. It is the function of the manifold block 60 and servo valve 12 to rapidly generate the control pressure in linear response to an input signal, in the present embodiment, an electrical current. The servo valve 12 utilized may be any of a number of currently, commercially available, electromagnetically operable servo values such as that produced and sold by Weston Hydraulics Limited, a subsidiary of Borg-Warner Corporation, Van Nuys, California. The conversion of a flow rate valve to a pressure control device is achieved by providing downstream orifice fittings 70 and 72 which have a size 1.88 times the maximum valve port area provided by conduits 74 and 76. This assures sonic flow into the servo regulators 30 or 32 during the entire travel of the servo valve operating member 42. Under isothermal flow conditions the pressure in the servo regulator 30, as shown in FIGURE 2, will be directly proportional to flow rate from the servo valve 12 which in turn is proportional to the valve port area as controlled by the electrical signal.

FIGURES 4 through 6 show further detail and the mode of interconnection of conduits 74 and 76 which receive the flow output from servo valve 12, the orifice fittings 70, 72, and the output fittings 66, 68. Also shown is the input fitting 62 in the manifold block 60 which communicates therethrough to provide operating pressure for the servo valve 12. The input fitting 62 is coupled directly to the source of pressurized fluid 37 in the manner illustrated in FIGURE 1.

Description of operation

Upon displacement of the missile from its predetermined attitude, electrical output signals will be generated from the rotor of the gyroscope 10 through electrical pickups 14 and 16 and will thence pass through the individual amplifiers 18 and 20 through summing amplifier 22 and demodulator 24. The resultant output to the two coils indicated in FIGURE 1 as +J and —J will determine which of the two servo regulators 30 and 32 is activated by control pressure flow from servo valve 12. As best shown in FIGURE 2, in the event of a positive voltage signal, control pressure is forwarded from the servo valve 12, through manifold block unit 60, and through conduit 38 to the lefthand thrust face of the driving piston 44 of servo regulator valve 30. This application of control pressure will move the cylinder valve operating member 42 rightwardly. It should be noted that operating or working pressure is at all times furnished through input conduit 40 to the servo regulator valve 30. Prior to the rightward movement of the valve operating member 32, operating pressure has thus been furnished through conduits 52 and apertures 54 in damping piston 46 to provide equal pressure on either thrust face of damping piston 46. As soon as the valve operating member 42 moves rightwardly, land 58 thereon emits operating pressure to the central chamber 34. Operating pressure is then communicated from chamber 34 with a force feedback effect through apertures 50 and into chamber 48 against the righthand thrust face of driving piston 44 to exert an opposing force to arrest rightward motion of operating member 42. At the same time the fluid in righthand chamber 36 is compressed and is forced readily through apertures 52 and apertures 54 in damping piston 46. The construction of the servo regulator 30 permits a force feedback effect against driving piston 44 and an almost simultaneous damping effect against damping piston 46. It should be further noted that the present mode of construction eliminates the need for mechanical damping devices such as springs which might provide a nonlinearly operating valve. This elimination of mechanical damping elements makes the servo regulator valve 30 a linear pneumatic amplifier whose output is controlled by a constant balance between the input control pressure and the output pressure in chamber 34, and is independent of the magnitude of supply pressure from pressurized fluid source 37. The present invention has additional advantages of utilizing the high density fluid supply as a damping medium. The high density supply gas from source 37 is readily available and its employment requires the use of no special seals in piston 46 since a slight leakage of this fluid causes no problem. The damping chamber 36 formed at the righthand end of valve body 32 is made to act as a degenerative spring. Clearance for operating member 42 is provided by chamber 55 which is vented through port 56.

It will thus be seen that we have provided a pressure regulator valve in which a control pressure from a relatively low-flow source can proportionally control the pressure of a working fluid from a relatively high flow source. The manner of proportional control is accomplished by a unique, balanced operating regulator valve in which valve opening and resultant downstream pressure is proportionally controlled in such a way that valve operation is not influenced by the fluid supply pressure. The pressure regulator valve is stabilized through the utilization of high density working fluid in operative working combination with the parts thereof as a damping medium.

We claim:

1. A servo regulator valve comprising a channeled valve body, a valve operating cylinder slidably mounted in said body and differentially movable between a closed and an open position, a driving piston having one face in communication with a source of working fluid when the valve is open and a longitudinally apertured damping piston mounted proximate different ends of said cylinder, a source of control fluid operatively connectible to the other face of the said driving piston and the source of working fluid operatively connected to said damping piston in all positions of said valve operating cylinder, and means retarding the feedback of fluid from said source of working fluid to said driving piston in the open position of said valve operating cylinder.

2. A servo regulator valve comprising a channeled body, a valve operating cylinder slidably mounted in said body and having a closed and an open position, a driving piston having two operative and oppositely disposed thrust faces and a damping piston having two operative and oppositely disposed thrust faces, said pistons mounted proximate different ends of said cylinder, a source of control fluid operatively connectible to one thrust face of said driving piston, and a source of working fluid operatively connected to the second thrust face of said driving piston in the open position of said cylinder and to the said two thrust faces of said damping piston to equalize the pressure thereon in the closed position of said cylinder, and means operable to retard the pressure feedback from said source of working fluid against the second thrust face of said driving piston in the open position of said operating cylinder.

3. A servo regulator valve comprising a channeled body, a valve operating cylinder slidably mounted in said body and having a closed and an open position, a driving piston having two operative and oppositely disposed thrust faces and a longitudinally apertured damping piston having two operative and oppositely disposed thrust faces and mounted in a spaced relationship on said cylinder, a source of control fluid operatively connectible to one of said thrust faces of said driving piston, and a source of working fluid operatively connected to said damping piston to equalize the pressure on both faces of said damping piston in the closed position of said valve operating cylinder, and an apertured partition mounted in said channeled body intermediate said driving piston and said damping piston operable to limit the turbulent effect of the pressure feedback from said source of working fluid against said second thrust face of said driving piston responsive to the movement of said operating cylinder.

4. A fluid handling servo regulator valve comprising a body, a first chamber portion having axially spaced control and outlet ports, a second annular chamber communicating with an inlet port formed in said body, a third annularly formed chamber portion of said body, a cylinder differentially positionable through said chamber portions, a driving piston mounted proximate one end of said cylinder, slidably movable in said first chamber portion and having first and second thrust faces, a damping piston mounted proximate the other end of said cylinder and slidably movable in said third chamber portion, said damping piston having at least one orifice extending longitudinally therethrough, a land portion of said cylinder mounted intermediate said driving piston and said damping piston and normally separating said first and second chamber portions, said cylinder movable axially in response to control fluid pressure applied through said control port against said first thrust face of said driving piston, said land operable to open said inlet port and connect said second chamber portion to said first chamber portion, and means restricting the flow of working fluid against said second thrust face of said driving piston in the open position of said land, said damping piston operable to equalize the working fluid pressure in said third chamber portion.

5. A proportional control valve comprising a channeled valve body, a valve operating means slidably mounted in said body and differentialy movable from a normally closed position, a first source of continuously variable control pressure operatively connectible to one end of said valve operating means, a second source of operating fluid operatively connectible to the other end of said valve operating means and communicating with said one end of said valve operating means in the open position of said valve, and an apertured partition mounted in said valve body between said one end of said valve operating means and said second source for limiting the pressure feedback from said second source responsive to movement of said valve operating means from its normally closed position.

6. The combination as set forth in claim 5 in which a dynamic balancing means is connected to said valve operating means.

7. The combination as set forth in claim 6 in which last mentioned means comprises a longitudinally apertured balancing piston having both its operating surfaces operatively connected to said second source independent of the position of said valve operating means.

8. The combination as set forth in claim 7 in which an arcuate chamber is connected to the inlet from said second source and a land portion is mounted on said valve operating means and movable through said chamber for blocking flow from said second source in the closed position of said valve operating means.

References Cited by the Examiner
UNITED STATES PATENTS

| | | | |
|---|---|---|---|
| 540,003 | 5/95 | Reed | 251—62 |
| 1,474,472 | 11/23 | Gulick | 251—45 X |
| 1,827,725 | 10/31 | Baker | 251—50 |
| 2,059,808 | 11/36 | Robart et al. | 251—63 X |
| 2,207,944 | 7/40 | Richardson | 251—50 |
| 2,410,375 | 10/46 | Wright | 251—62 X |
| 2,698,730 | 1/55 | Ensminger | 251—52 |
| 2,705,020 | 3/55 | Frantz | 251—63 X |
| 2,811,982 | 11/57 | Young | 371—561 |
| 2,830,784 | 4/58 | Placette | 251—50 X |
| 2,881,796 | 4/59 | Garraway | 137—561 |
| 2,964,287 | 12/60 | Farkas | 251—31 |

FOREIGN PATENTS

| | | |
|---|---|---|
| 417,438 | 8/10 | France. |

ISADOR WEIL, *Primary Examiner.*

WILLIAM F. O'DEA, MARTIN P. SCHWADRON,
*Examiners.*